(12) United States Patent
Pei et al.

(10) Patent No.: US 11,140,419 B2
(45) Date of Patent: Oct. 5, 2021

(54) IMAGE PROCESSING METHOD AND DEVICE

(71) Applicant: SHENZHEN UNIVERSITY, Guangdong (CN)

(72) Inventors: Jihong Pei, Guangdong (CN); Xuhui Shao, Guangdong (CN); Xuan Yang, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 153 days.

(21) Appl. No.: 16/586,979

(22) Filed: Sep. 28, 2019

(65) Prior Publication Data

US 2020/0169759 A1 May 28, 2020

Related U.S. Application Data

(63) Continuation of application No. PCT/CN2018/117692, filed on Nov. 27, 2018.

(51) Int. Cl.
| | |
|---|---|
| *H04N 19/86* | (2014.01) |
| *H04N 19/82* | (2014.01) |
| *H04N 19/105* | (2014.01) |
| *H04N 19/126* | (2014.01) |

(52) U.S. Cl.
CPC ......... *H04N 19/865* (2014.11); *H04N 19/105* (2014.11); *H04N 19/82* (2014.11); *H04N 19/126* (2014.11)

(58) Field of Classification Search
None
See application file for complete search history.

(56) References Cited

U.S. PATENT DOCUMENTS

| | | | | |
|---|---|---|---|---|
| 2005/0243912 | A1* | 11/2005 | Kwon | .................. H04N 19/137 375/240.03 |
| 2010/0027909 | A1* | 2/2010 | Au | ......................... H04N 19/86 382/275 |

* cited by examiner

*Primary Examiner* — Kate H Luo (57) ABSTRACT

The present disclosure provides an image processing method and device, which are applied to the technical field of image processing, wherein the method comprises: dividing an infrared decompression image with block artifacts into image blocks distributed in a rectangular array; acquiring boundary gray information of the image blocks, and then determining boundary drop information of each image block and its adjacent image block, thereby obtaining drop information of the image block; constructing a constraint optimization objective function of the image based on the boundary drop information, the drop information and preset compensation information; determining a target compensation matrix according to the constraint optimization objective function, wherein each element value in the target compensation matrix is a target value of compensation information of an image block, the position of which in the image is the same as the position of the element value in the target compensation matrix.

8 Claims, 4 Drawing Sheets

IMAGE PROCESSING METHOD AND DEVICE

CROSS-REFERENCE TO RELATED APPLICATION

This application is a continuation of International Application No. PCT/CN2018/117692, filed on Nov. 27, 2018, the contents thereof are incorporated herein by reference in its entirety.

TECHNICAL FIELD

The present disclosure relates to the field of image processing technologies, and in particular, to an image processing method and device.

BACKGROUND

With the rapid development of domestic science and technology, infrared imaging technologies have been applied to various fields including biology, medicine, geonomy, military reconnaissance and the like. In comparison with visible light imaging, the infrared imaging has the advantages of high resolution, long operating distance, all-weather operations at night or in the dark and the like. However, video data collected by an infrared thermal imager has relatively great volume, so due to limitation of storage capacity and transmission bandwidth, it is stored and transmitted by mainly utilizing a compression technology, such as a block discrete cosine transform (BDCT) based image and video compression standard, during practical application, but according to the BDCT-based image standard, individual quantizing and encoding are performed by utilizing a block as a unit to break correlation of a pixel in adjacent blocks, so due to rough quantization at low bit rate, gray discontinuity is generated at the boundary of the adjacent blocks, obvious blocking artifacts are generated, and image quality is seriously reduced.

Therefore, the blocking artifacts in infrared images are removed generally by utilizing a deblocking algorithm to improve the image quality, but according to the current deblocking algorithm, a boundary discontinuity problem caused by the blocking artifacts is solved generally by smoothing pixel points at the boundary of an image block, and there is a problem that a direct current component of the image block is not compensated.

SUMMARY

A main objective of embodiments of the present disclosure is to provide an image processing method and device, which can compensate a direct current component lost in an image with block artifacts so as to remove the block artifacts of the image to improve the image quality.

The first embodiment of the present disclosure provides an image processing method. The method comprises: dividing an infrared decompression image with block artifacts into image blocks distributed in a rectangular array; acquiring boundary gray information of the image blocks, determining boundary drop information of each image block and its adjacent image block according to the boundary gray information of the image blocks, and obtaining drop information of the image block according to the boundary drop information; constructing a constraint optimization objective function of the infrared decompression image based on the boundary drop information, the drop information and preset compensation information; determining a target compensation matrix according to the constraint optimization objective function, wherein each element value in the target compensation matrix is a target value of compensation information of an image block, the position of which in the infrared decompression image is the same as the position of the element value in the target compensation matrix, and each element value in the target compensation matrix meets a condition, under which the constraint optimization objective function is minimum; according to the element value in the target compensation matrix, compensating a direct current component of an image block whose position in the infrared decompression image is the same as that of the element value in the target compensation matrix, and performing smoothing process on the compensated infrared decompression image to remove the block artifacts in the infrared decompression image.

The second embodiment of the present disclosure provides an image processing device. The device comprises: a dividing unit, used for dividing an infrared decompression image with block artifacts into image blocks distributed in a rectangular array; an acquiring unit, used for acquiring boundary gray information of the image blocks, determining boundary drop information of each image block and its adjacent image block according to the boundary gray information of the image blocks, and obtaining drop information of the image block according to the boundary drop information; a constructing unit, used for constructing a constraint optimization objective function of the infrared decompression image based on the boundary drop information, the drop information and preset compensation information; a determining unit, used for determining a target compensation matrix according to the constraint optimization objective function, wherein each element value in the target compensation matrix is a target value of compensation information of an image block, the position of which in the infrared decompression image is the same as the position of the element value in the target compensation matrix, each element value in the target compensation matrix meets a condition, and under which the constraint optimization objective function is minimum; a compensating unit, used for compensating a direct current component of an image block, the position of which in the infrared decompression image is the same as the position of the element value in the target compensation matrix, according to the element value in the target compensation matrix; and a filtering unit, used for performing smoothing process on the compensated infrared decompression image to remove the block artifacts in the infrared decompression image.

Based on the above embodiments, the target compensation matrix is determined by constructing the constraint optimization objective function, and the direct current component of the image block, the position of which in the infrared decompression image is the same as the position of the element value in the target compensation matrix, is compensated by utilizing the element values in the target compensation matrix so as to remove the blocking artifacts in the infrared decompression image, but not to remove the blocking artifacts by performing the smoothing process on pixel points at the boundary of the image blocks of the infrared decompression image; therefore, the direct current component lost by each image block can be compensated, and the block artifacts of decompression images compressed at various bit rates can be adaptively removed so as to improve operating efficiency.

BRIEF DESCRIPTION OF THE DRAWINGS

In order to more clearly illustrate the technical solutions in the embodiments of the present disclosure, the drawings used in the description of the embodiments will be briefly described below. Obviously, the drawings in the following description are some embodiments of the present disclosure. Those skilled in the art can also obtain other drawings based on these drawings without creative efforts.

DESCRIPTION OF THE EMBODIMENTS

To make the foregoing objective, features, and advantages of the present disclosure clearer and more comprehensible, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of skill in the art based on the embodiments of the present disclosure without creative efforts shall fall within the protection scope of the present disclosure.

Figure 1:
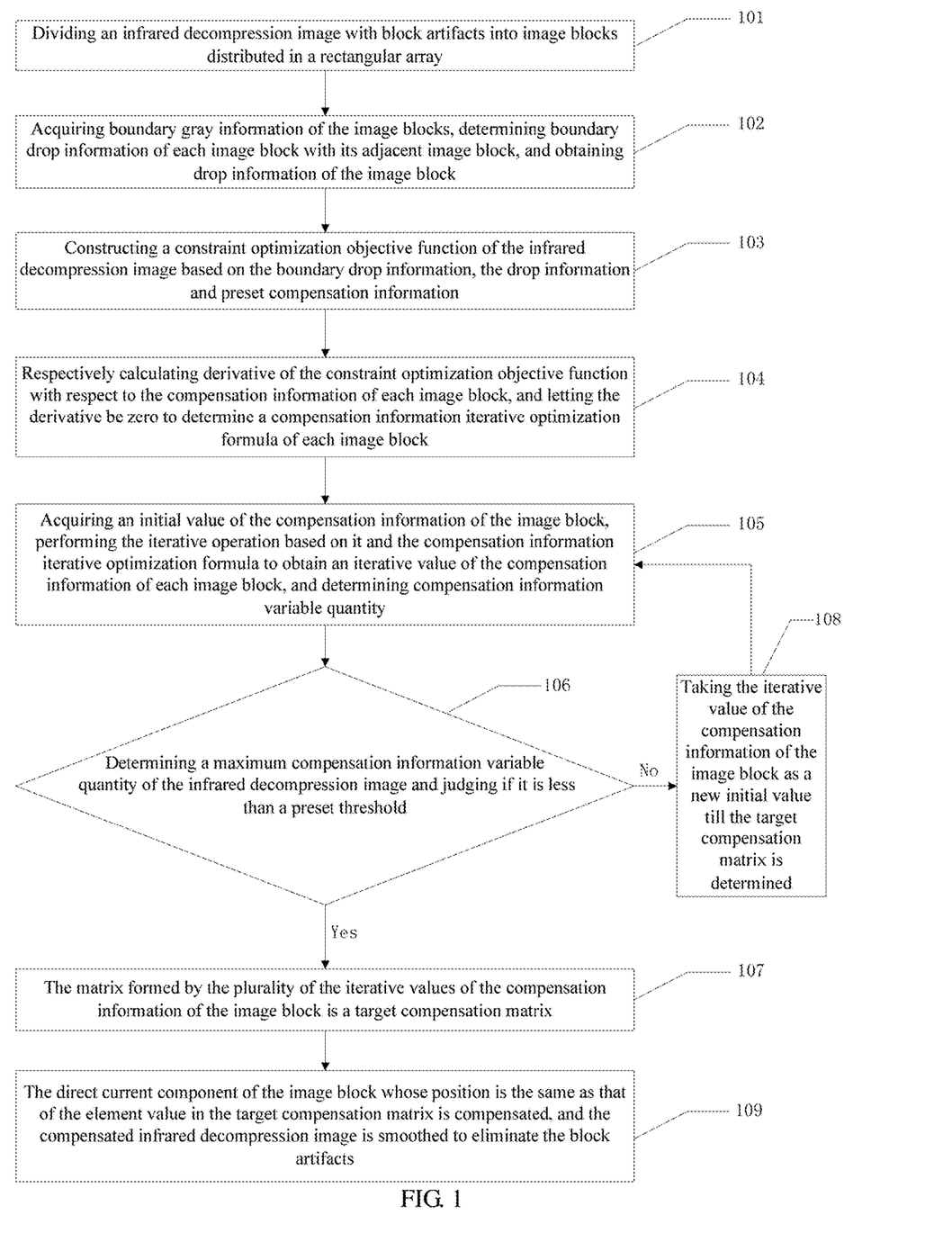
FIG. 1 is a schematic diagram of an implementation flow of an image processing method in the first embodiment provided by the present disclosure.

Referring to FIG. 1, FIG. 1 is a schematic diagram of an implementation flow of an image processing method in the first embodiment provided by the present disclosure. As shown in FIG. 1, the method mainly comprises the following steps.

101: dividing an infrared decompression image with block artifacts into image blocks distributed in a rectangular array.

Specifically, a terminal compresses an infrared image by utilizing a BDCT-based image compression standard to obtain an infrared compression image, then decompresses the infrared compression image to obtain an infrared decompression image. According to the BDCT-based image compression standard, individual quantizing and encoding are performed by taking an image block as a unit to break correlation of a pixel between two adjacent image blocks, so the infrared decompression image has the blocking artifacts.

Illustratively, if the individual quantizing and the encoding are performed on an 8*8 image block according to the BDCT-based image compression standard, an infrared decompression image with the size of 8m*8n is divided into mn image blocks $x_{i,j}$ (1≤i≤m, 1≤j≤n) distributed in a rectangular array, wherein a subscript (i, j) represents that an image block is located in the $i^{th}$ row and the $j^{th}$ column of the infrared decompression image.

102: acquiring boundary gray information of the image blocks, determining boundary drop information of each image block according to the boundary gray information of the image blocks, and obtaining drop information of the image block according to the boundary drop information.

Specifically, the terminal acquires boundary gray information of each image block according to the divided infrared decompression image.

Furthermore, after the boundary gray information of each image block is acquired, the method further comprises: respectively dividing the image block into one element of a group including an image block located at the center of the image, an image block located at one corner of the image, and an image block located at a boundary of the image according to position information of the image block in the infrared decompression image.

Figure 2:
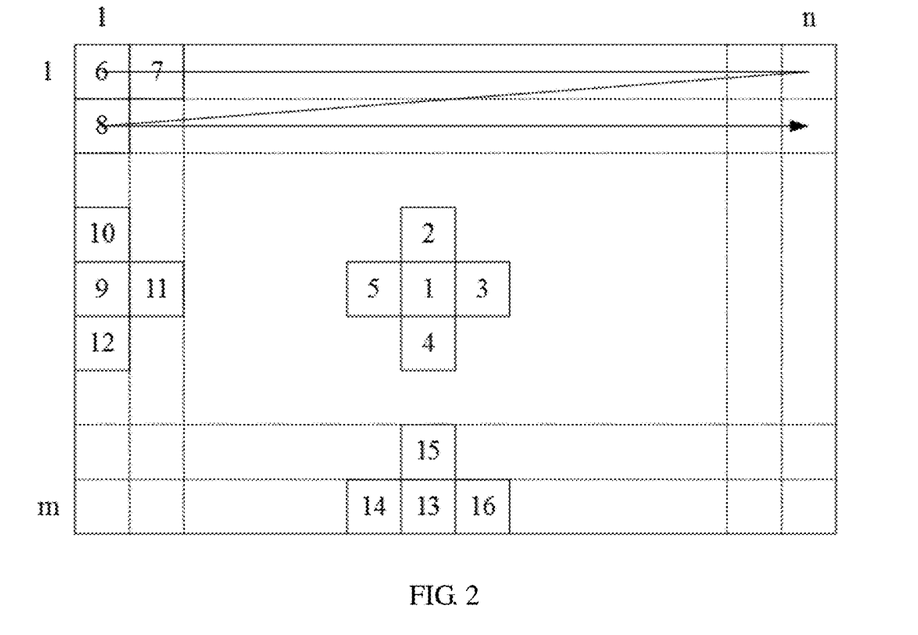
FIG. 2 is a schematic diagram of an image block of an image processing method in the first embodiment provided by the present disclosure.
Figure 3:
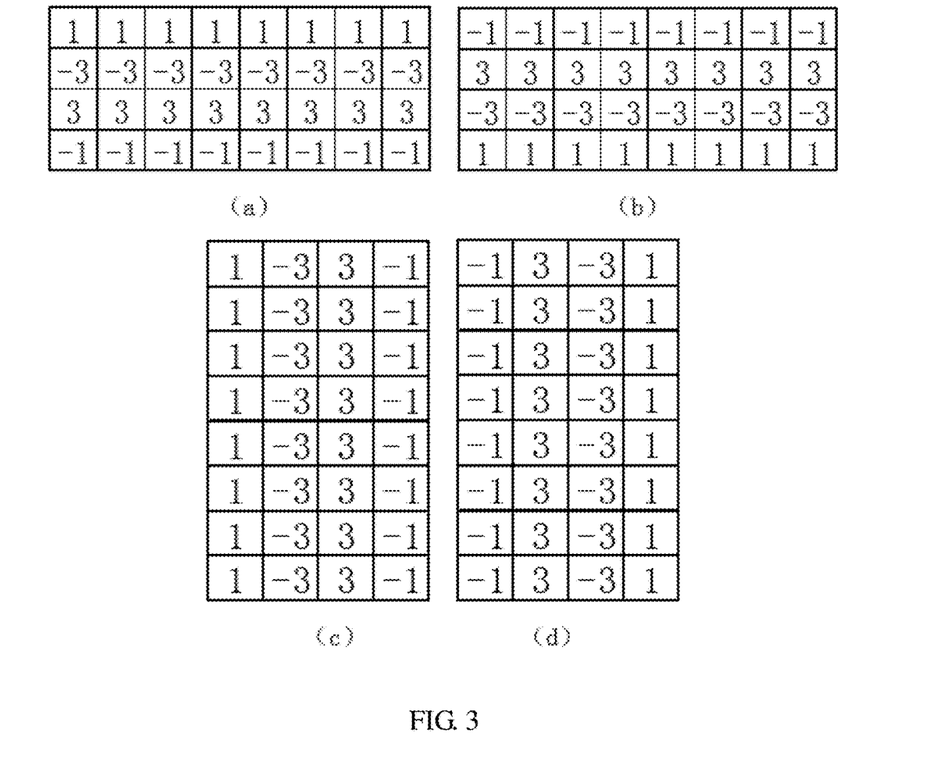
FIG. 3 is a schematic diagram of drop information of each image block in an image processing method in the first embodiment provided by the present disclosure.

Specifically, FIG. 2 is a schematic diagram of a position of an image block, wherein an image block 1 is located at the center of the image, and an image block 2, an image block 3, an image block 4 and an image block 5 are respectively an upper block, a right block, a lower block and a left block adjacent to the image block 1; an image block 6 is located at one corner of the image, and an image block 7 and an image block 8 are respectively a right block and a lower block adjacent to the image block 6; an image block 9 and an image block 13 are located at the boundary of the image, the image block 9 is located at the left boundary of the image, an image block 10, an image block 11 and an image block 12 are respectively an upper block, a right block and a lower block adjacent to the image block 9, the image block 13 is located at the lower boundary of the image, and an image block 14, an image block 15 and an image block 16 are respectively a left block, an upper block and a right block adjacent to the image block 13.

Wherein the terminal acquires the boundary drop information of each image block according to preset boundary drop information operation templates. For the image block located at the center of the image, the boundary drop information of a middle block and an upper block, the boundary drop information of the middle block and a lower block, the boundary drop information of the middle block and a left block and the boundary drop information of the middle block and a right block at the boundary are respectively acquired by utilizing four preset boundary drop information operation templates.

Wherein for the image block located at the boundary of the image, and by taking an image block located at an upper boundary of the image for an example, the boundary drop information of the middle block and the lower block, the boundary drop information of the middle block and the left block and the boundary drop information of the middle block and the right block at the boundary are respectively acquired by utilizing three preset boundary drop information operation templates. It should be understood that the determination manner of the boundary drop information of an image block located at the left boundary of the image, an image block located at the lower boundary of the image and an image block located at the right boundary of the image is the same as the determination manner of the boundary drop information of the image block located at the upper boundary of the image.

Wherein for the image block located at one corner of the image, and by taking an image block located at a left upper corner of the image for an example, the boundary drop information of the middle block and the lower block and the boundary drop information of the middle block and the right block at the boundary are respectively acquired by utilizing two preset boundary drop information operation templates. It should be understood that the determination manner of the boundary drop information of an image block located at a left lower corner of the image, an image block located at a right upper corner of the image and an image block located at a right lower corner of the image is the same as the determination manner of the boundary drop information of the image block located at the left upper corner of the image.

Wherein the size of the preset boundary drop information operation template corresponds to two rows/columns of pixel points of an adjacent boundary block so that the size of the preset boundary drop information operation template is related to the position of the adjacent block corresponding to the middle block. As shown in FIG. 3, the specific operation procedure of the preset boundary drop information operation template is as follows: in a direction from the middle block to its periphery, firstly calculating an intra-block difference and an inter-block difference of two adjacent blocks, then performing second-order difference based on three first-order differences, and finally acquiring ¹⁄₁₆ times cumulative sum of the second-order difference.

Wherein according to the boundary drop information of the image block and the adjacent image blocks, determining boundary drop average information of the image block and the adjacent image blocks, recording as $\{\varepsilon_{U,i,j}, \varepsilon_{D,i,j}, \varepsilon_{L,i,j}, \varepsilon_{R,i,j}\}$, and taking the sum of the boundary drop average information of the image block and the adjacent image blocks as the drop information of the image block, as shown in the following formula:

$$\varepsilon_{i,j} = \varepsilon_{U,i,j} + \varepsilon_{L,i,j} + \varepsilon_{R,i,j};$$

wherein $\varepsilon_{i,j}$ is the drop information of an image block in the $i^{th}$ row and the $j^{th}$ column of the infrared decompression image, $\varepsilon_{U,i,j}$ is the boundary drop average information of the image block in the $i^{th}$ row and the $j^{th}$ column of the infrared decompression image and the upper block, $\varepsilon_{D,i,j}$ is the boundary drop average information of the image block in the $i^{th}$ row and the $j^{th}$ column of the infrared decompression image and the lower block, $\varepsilon_{L,i,j}$ is the boundary drop average information of the image block in the $i^{th}$ row and the $j^{th}$ column of the infrared decompression image and the left block, and $\varepsilon_{R,i,j}$ is the boundary drop average information of the image block in the $i^{th}$ row and the $j^{th}$ column of the infrared decompression image and the right block.

103: constructing a constraint optimization objective function of the infrared decompression image based on the boundary drop information, the drop information and preset compensation information.

Specifically, a quantization error is mainly from excessive quantization of DCT domain direct current component and alternating current component in the image processing procedure, wherein the direct current component is a gray average value of the image block and represents the overall brightness of the image block, and due to the excessive quantization, adjacent image blocks originally having similar brightness generate obvious brightness difference to cause gray drop, which is visually shown as the block artifact. To reduce the brightness difference of the adjacent image blocks, the embodiment constructs a constraint optimization objective function to determine a target compensation matrix and compensates the direct current component of the infrared decompression image according to the target compensation matrix to reduce the block artifacts.

Wherein the constraint optimization objective function of the infrared decompression image is constructed based on the boundary drop information, the drop information and the compensation information of the image block. The constraint optimization objective function is shown as the following formula:

$$J = \frac{1}{2}(E + \lambda_1 C_1 + \lambda_2 C_2 + \lambda_3 C_3 + \lambda_4 C_4);$$

wherein J represents the constraint optimization objective function, E represents a total square error of the block artifacts after compensation is completed, $C_1$ and $C_2$ respectively represent a compensation information total offset constraint term and a compensation information penalty term, $C_3$ and $C_4$ respectively represent an upper-lower-boundary compensation information constraint term and a left-right-boundary compensation information penalty term, $\lambda_1, \lambda_2, \lambda_3$ and $\lambda_4$ respectively are the first weight parameter, the second weight parameter, the third weight parameter and the fourth weight parameter and are respectively used for adjusting the weight of the $C_1$, the weight of the $C_2$, the weight of the $C_3$ and the weight of the $C_4$, and $\lambda_1, \lambda_2, \lambda_3$ and $\lambda_4$ are greater than 0.

In the embodiment, the total square error of the block artifacts after compensation E is a sum of square errors $e_{i,j}^2$ of the block artifacts after all image blocks $x_{i,j}$ in the infrared decompression image undergo direct current component compensation, and is shown as the following formula:

$$E = \sum_{i=1}^{m}\sum_{j=1}^{n} e_{i,j}^2.$$

Wherein the square error $e_{i,j}^2$ of the block artifacts after the image block $x_{i,j}$ undergo the direct current component compensation is a sum of squares of block artifact errors of the middle block and its upper, lower, left and right adjacent blocks. A method for acquiring a block artifact error of the middle block and its adjacent blocks at the boundary specifically comprises: the boundary drop information of the middle block plus the compensation information of the middle block and then minus the compensation information of its adjacent blocks, wherein its size and the block artifact error of the middle block and the adjacent blocks at the boundary are opposite numbers with each other. The block artifact error of the middle block can be obtained by calculating a sum of block artifact errors of the middle block and its upper, lower, left and right adjacent blocks at the boundary.

In the embodiment, the square of the sum of the compensation information of the all image blocks in the infrared decompression image is taken as the compensation information total offset constraint term $C_1$ in order to avoid that the overall obtained compensation information is excessively large or small, and the sum of squares of the compensation information of the all image blocks in the image is taken as the compensation information penalty term $C_2$ in order to avoid that single compensation information is excessively large or small, as shown in the following formula:

$$C_1 = \left(\sum_{i=1}^{m}\sum_{j=1}^{n} v_{i,j}\right)^2;$$

$$C_2 = \sum_{i=1}^{m}\sum_{j=1}^{n} v_{i,j}^2;$$

wherein $v_{i,j}$ is the compensation information of the image block in the $i^{th}$ row and the $j^{th}$ column of the infrared decompression image.

Wherein the compensation information of the image block in the infrared decompression image may be gradually cumulated in a certain direction to cause that the gray of an image after the compensation is completed generates gradual change, and in order to overcome such problem, drop gradients corresponding to image blocks at the upper boundary and the lower boundary and image blocks at the left boundary and the right boundary of the image after the compensation is completed are respectively defined as two compensation value boundary stable constraint terms $C_3$ and $C_4$, as shown in the following formula:

$$C_3 = \left[\frac{1}{n}\sum_{j=1}^{n}(\varepsilon_{m,j} + v_{m,j}) - \frac{1}{n}\sum_{j=1}^{n}(\varepsilon_{1,j} + v_{1,j})\right]^2;$$

$$C_4 = \left[\frac{1}{m}\sum_{i=1}^{m}(\varepsilon_{i,n} + v_{i,n}) - \frac{1}{m}\sum_{i=1}^{m}(\varepsilon_{i,1} + v_{i,1})\right]^2;$$

wherein $\varepsilon_{m,j}$ is drop information of an image block in the $m^{th}$ row and the $j^{th}$ column of the infrared decompression image, $v_{m,j}$ is compensation information of the image block in the $m^{th}$ row and the $j^{th}$ column of the infrared decompression image, $\varepsilon_{1,j}$ is drop information of an image block in the first row and the $j^{th}$ column of the infrared decompression image, $v_{1,j}$ is compensation information of the image block in the first row and the $j^{th}$ column of the infrared decompression image, $\varepsilon_{i,n}$ is drop information of an image block in the $i^{th}$ row and the $n^{th}$ column of the infrared decompression image, $v_{i,n}$ is compensation information of the image block in the $i^{th}$ row and the $n^{th}$ column of the infrared decompression image, $\varepsilon_{i,1}$ is drop information of an image block in the $i^{th}$ row and the first column of the infrared decompression image, and $v_{i,1}$ is compensation information of the image block in the $i^{th}$ row and the first column of the infrared decompression image.

104: respectively calculating derivative of the constraint optimization objective function with respect to the compensation information of each image block, and letting the derivative be zero to determine a compensation information iterative optimization formula of each image block.

Specifically, the derivative of the constraint optimization objective function to the compensation information of each image block is zero, which is shown in the following formula:

$$\frac{\partial J}{\partial v_{i,j}} = 0;$$

according to the formula, a compensation information optimization formula of each image block can be determined so as to determine the compensation information iterative optimization formula of each image block, wherein the difference between the compensation information iterative optimization formula of each image block and the compensation information optimization formula of each image block is: the compensation information iterative optimization formula additionally has an iterative variable k, so the value of the compensation information obtained after the image block performs a iterative operation according to the compensation information iterative optimization formula meets a condition, under which the constraint optimization objective function is minimum.

Furthermore, the number and the direction of image blocks adjacent to image blocks at different position in the infrared decompression image are different, so the idea for performing the iterative operation on the compensation information of the image blocks at different positions in the infrared decompression image is same, but the compensation information iterative optimization formula is different.

Therefore, the respectively performing derivation on the compensation information of each image block according to the constraint optimization objective function, and letting derivative of the constraint optimization objective function to the compensation information of each image block be zero to determine a compensation information iterative optimization formula of each image block comprises:

according to an image block located at the center of the image, respectively performing derivation on the compensation information of each image block according to the constraint optimization objective function, and letting derivative of the constraint optimization objective function to the compensation information of each image block be zero to determine the first compensation information iterative optimization formula of each image block;

according to an image block located at a corner of the image, respectively performing derivation on the compensation information of each image block according to the constraint optimization objective function, and letting derivative of the constraint optimization objective function to the compensation information of each image block be zero to determine the second compensation information iterative optimization formula of each image block; and according to an image block located at a boundary of the image, respectively performing derivation on the compensation information of each image block according to the constraint optimization objective function, and letting derivative of the constraint optimization objective function to the compensation information of each image block be zero to determine the third compensation information iterative optimization formula of each image block.

Furthermore, the first compensation information iterative optimization formula is as follows:

$$v_{i,j}^{k+1} = \frac{2Q_{i,j}^k - 2\varepsilon_{i,j} - \lambda_1(V^k - v_{i,j}^k)}{8 + \lambda_1 + \lambda_2},$$

$$2 \le i \le m-1, 2 \le j \le n-1;$$

the second compensation information iterative optimization formula is as follows:

$$v_{i,j}^{k+1} = \frac{2Q_{i,j}^k - 2\varepsilon_{i,j} - \lambda_1(V^k - v_{i,j}^k)}{4 + \lambda_1 + \lambda_2},$$

$$i = 1, m, j = 1, n;$$

the third compensation information iterative optimization formula is as follows:

$$v_{i,j}^{k+1} = \frac{2Q_{i,j}^k - 2\varepsilon_{i,j} - (-1)^{\varphi_1}\frac{1}{n^2}\lambda_3(D_{vr}^k + D_{\varepsilon r}) - \lambda_1 V^k + \left(\lambda_1 + \frac{1}{n^2}\lambda_3\right)v_{i,j}^k}{6 + \lambda_1 + \lambda_2 + \frac{1}{n^2}\lambda_3},$$

$$i = 1, m, 2 \le j \le n-1;$$

$$v_{i,j}^{k+1} = \frac{2Q_{i,j}^k - 2\varepsilon_{i,j} - (-1)^{\varphi_2}\frac{1}{m^2}\lambda_4(D_{vc}^k + D_{\varepsilon c}) - \lambda_1 V^k + \left(\lambda_1 + \frac{1}{m^2}\lambda_4\right)v_{i,j}^k}{6 + \lambda_1 + \lambda_2 + \frac{1}{m^2}\lambda_4},$$

$$2 \le i \le m-1, j = 1, n;$$

wherein $v_{i,j}^{k+1}$ is compensation information after an image block in the $i^{th}$ row and the $j^{th}$ column of the infrared decompression image performs the $k^{th}$ iterative operation, $Q_{i,j}^{k}$ is a sum of compensation information of image blocks adjacent to the image block in the $i^{th}$ row and the $j^{th}$ column of the infrared decompression image before the $k^{th}$ iterative operation is performed, $\varepsilon_{i,j}$ is drop information of the image block in the $i^{th}$ row and the $j^{th}$ column of the infrared decompression image, $\lambda_1$, $\lambda_2$, $\lambda_3$ and $\lambda_4$ respectively are the first weight parameter, the second weight parameter, the third weight parameter and the fourth weight parameter and are greater than 0, $V^k$ is a sum of compensation information of a plurality of image blocks before the $k^{th}$ iterative operation is performed, $D_{vr}^{k}$ and $D_{vc}^{k}$ are upper-lower-boundary compensation gradient and left-right-boundary compensation gradient before the $k^{th}$ iterative operation is performed, $D_{\varepsilon r}$ and $D_{\varepsilon c}$ are upper-lower-boundary drop different information and left-right-boundary drop different information, and $v_{i,j}^{k}$ is compensation information before the image block in the $i^{th}$ row and the $j^{th}$ column of the infrared decompression image performs the $k^{th}$ iterative operation.

Wherein a boundary stable constraint term is added to an image block located at the boundary of the image, and correspondingly compensation value gradient related to the image block is added.

Wherein $D_{vr}^{k}$ is obtained by averaging after respectively performing first-order difference on image blocks located in the same column of the compensation information of image blocks at the lower boundary of the image and image blocks at the upper boundary of the image before the $k^{th}$ iterative operation is performed, and similarly, $D_{vc}^{k}$ is obtained by averaging after respectively performing first-order difference on image blocks located in the same row of the compensation information of image blocks at the right boundary of the image and image blocks at the left boundary of the image before the $k^{th}$ iterative operation is performed.

Wherein $D_{\varepsilon r}$ and $D_{\varepsilon c}$ are two constants, $D_{\varepsilon r}$ is an average difference of the compensation information of the image block located at the lower boundary of the image and the compensation information of the image block located at the upper boundary of the image, and $D_{\varepsilon c}$ is an average difference of the compensation information of the image block located at the right boundary of the image and the compensation information of the image block located at the left boundary of the image.

105: acquiring an initial value of the compensation information of the image block, performing the iterative operation based on the initial value of the compensation information of the image block and the compensation information iterative optimization formula to obtain an iterative value of the compensation information of each image block, and determining compensation information variable quantity according to the initial value and the iterative value of the compensation information of the image block.

Specifically, a compensation information initial matrix of the infrared decompression image is acquired, and an element value of the compensation information initial matrix corresponding to the position of the image block in the infrared decompression image is the initial value of the compensation information of the image block. In practical application, the compensation information initial matrix may be a null matrix. Meanwhile, the terminal acquires an initial value of a weight parameter. In practical application, initial values of $\lambda_1$, $\lambda_2$, $\lambda_3$ and $\lambda_4$ respectively are 2, 2, 0.1 and 0.1, wherein the iterative value of the compensation information of the image block minus the initial value of the compensation information of the image block to be capable of determining the compensation information variable quantity.

Optionally, iterative operation is sequentially performed on image blocks according to an arrow direction in FIG. 2, and after all image blocks perform the iterative operation according to each compensation information iterative optimization formula once, the compensation information variable quantity of each image block is calculated.

106: according to a plurality of the compensation information variable quantities of the image block, determining a maximum compensation information variable quantity of the infrared decompression image and judging whether the maximum compensation information variable quantity is less than a preset threshold.

Specifically, a maximum value is selected from the plurality of the compensation information variable quantities of the image block to be as the maximum compensation information variable quantity of the infrared decompression image. The initial value of the compensation information of the image block is obtained by artificial initialization, so in an inverse compensation information calculation procedure, there is a certain offset between a compensation information iterative value matrix formed by a plurality of iterative values of the compensation information of the image block and a value of a compensation information initial matrix, and such offset is described by utilizing the compensation information variable quantity. Wherein the smaller the offset is, the closer the compensation information iterative value matrix is to a stable state. Therefore, after the iterative operation is determined to be performed in a manner of judging whether the maximum compensation information variable quantity is less than the preset threshold, it can be determined whether a matrix formed by a plurality of iterative values of the compensation information of the image block achieves the stable state. Optionally, the preset threshold can be set as 0.0001.

Wherein if the maximum compensation information variable quantity is less than the preset threshold, step 107 is performed: the matrix formed by the plurality of the iterative values of the compensation information of the image block is a target compensation matrix. If the maximum compensation information variable quantity is less than the preset threshold, according to the position of the image block in the infrared decompression image, the matrix formed by the plurality of the iterative values of the compensation information of the image block achieves the stable state, and the matrix formed by the plurality of the iterative values of the compensation information of the image block is the target compensation matrix.

Wherein if the maximum compensation information variable quantity is not less than the preset threshold, step 108 is performed: the iterative value of the compensation information of the image block is taken as a new initial value, and the step of performing the iterative operation based on the initial value of the compensation information of the image block and the compensation information iterative optimization formula is performed till the target compensation matrix is determined. If the maximum compensation information variable quantity is not less than the preset threshold, the matrix formed by the plurality of the iterative values of the compensation information of the image block does not achieve the stable state, and the target compensation matrix is finally obtained in a manner of continuously performing the iterative operation on the matrix formed by the plurality of the iterative values of the compensation information of the image block.

Wherein each element value in the target compensation matrix is a target value of the compensation information of an image block, the position of which in the infrared decompression image is the same as the position of the element value in the target compensation matrix, and each element value in the target compensation matrix meets the condition, under which the constraint optimization objective function is minimum.

109: according to the element value in the target compensation matrix, compensating a direct current component of the image block whose position in the infrared decompression image is the same as that of the element value in the target compensation matrix, and performing smoothing process on the compensated infrared decompression image to remove the block artifacts in the infrared decompression image.

Figure 4:
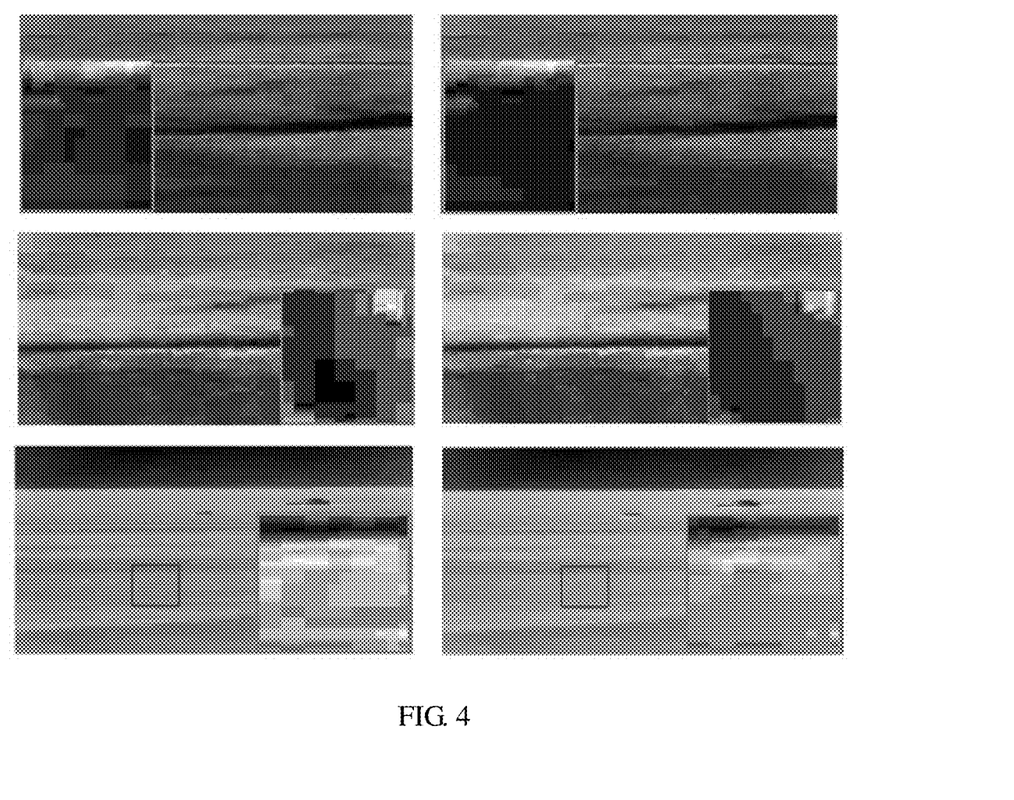
FIG. 4 is a comparison diagram of an image processing method in the first embodiment provided by the present disclosure.

Specifically, if a nonzero direct current component is compensated to the image block, the average brightness of the image block is increased or reduced; the greater the compensated direct current component is, the greater the average brightness variation of the image block is, vice verse; therefore, the direct current component of the image block at the corresponding position in the infrared decompression image is compensated according to the element value in the target compensation matrix such that the brightness of the compensated image block is close to the brightness of its adjacent image block, thereby reducing the discontinuity of the image blocks.

Wherein the image block compensation procedure can be represented by the following formula:

$$y_{i,j}=x_{i,j}+v_{i,j}I \; i=1,\ldots,m, j=1,\ldots,n.$$

Wherein $y_{i,j}$ is an image block which direct current component is compensated, I is an 8*8 unit matrix, and the same size of direct current component is compensated to each pixel point in the 8*8 image block.

Wherein to avoid overall blurring of the smooth image, in the embodiment, by taking the pixel point at the boundary of the image block as a processing object, a random weight value is selected to perform gray modification on the pixel point at the boundary of the image block in a quantization prior manner so as to achieve an image smoothing effect. As shown in FIG. 4, the left image is an image before processing, and the right image in the same row is an image after processing, so, obviously the block artifacts are greatly improved by utilizing the image processing method in the embodiment.

In the embodiments of the present disclosure, the target compensation matrix is determined by constructing the constraint optimization objective function, and the direct current component of the image block, the position of which in the infrared decompression image is the same as the position of the element value in the target compensation matrix, is compensated by utilizing the element values in the target compensation matrix so as to remove the blocking artifacts in the infrared decompression image, but not to remove the blocking artifacts by performing the smoothing process on pixel points at the boundary of the image blocks of the infrared decompression image; therefore, the direct current component lost by each image block can be compensated, and the block artifacts of decompression images compressed at various bit rates can be adaptively removed so as to improve operating efficiency. Additionally, the filtering unit is used for performing the smoothing process on the compensated infrared compression image so as to further improve the image quality.

Figure 5:
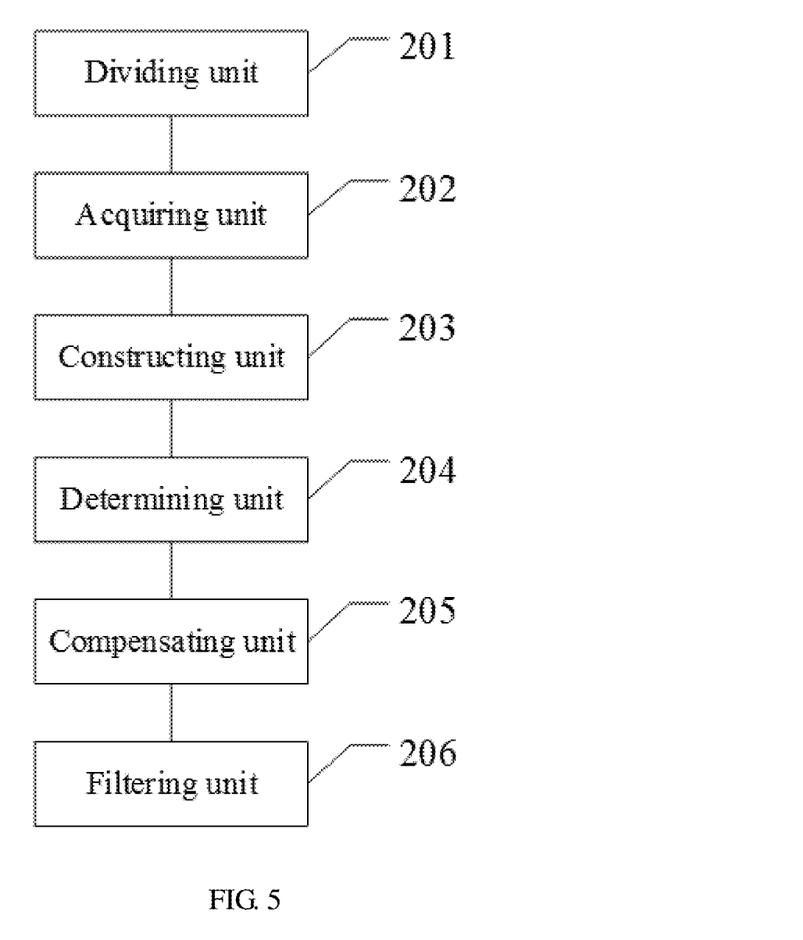
FIG. 5 is a schematic structural diagram of an image processing device in the second embodiment provided by the present disclosure.

Referring to FIG. 5, FIG. 5 is a schematic structural diagram of an image processing device in the second embodiment provided by the present disclosure. As shown in FIG. 5, the device comprises:

a dividing unit 201, used for dividing an infrared decompression image with block artifacts into image blocks distributed in a rectangular array;

an acquiring unit 202, used for acquiring boundary gray information of the image blocks, determining boundary drop information of each image block and its adjacent image block according to the boundary gray information of the image blocks, and obtaining drop information of the image block according to the boundary drop information;

a constructing unit 203, used for constructing a constraint optimization objective function of the infrared decompression image based on the boundary drop information, the drop information and preset compensation information;

a determining unit 204, used for determining a target compensation matrix according to the constraint optimization objective function, wherein each element value in the target compensation matrix is a target value of compensation information of an image block, the position of which in the infrared decompression image is the same as the position of the element value in the target compensation matrix, and each element value in the target compensation matrix meets a condition, under which the constraint optimization objective function is minimum;

a compensating unit 205, used for compensating a direct current component of an image block, the position of which in the infrared decompression image is the same as the position of the element value in the target compensation matrix, according to the element value in the target compensation matrix; and a filtering unit 206, used for performing smoothing process on the compensated infrared decompression image to remove the block artifacts in the infrared decompression image.

Furthermore, the determining unit 204 is further used for respectively calculating derivative of the constraint optimization objective function with respect to the compensation information of each image block, and letting the derivative be zero to determine a compensation information iterative optimization formula of each image block.

The determining unit 204 is further used for determining a target compensation matrix according to a plurality of compensation information iterative optimization formulas of the image blocks.

The determining unit 204 is further used for acquiring an initial value of the compensation information of the image block, performing an iterative operation based on the initial value of the compensation information of the image block and the compensation information iterative optimization formula to obtain an iterative value of the compensation information of each image block, and determining a compensation information variable quantity according to the initial value and the iterative value of the compensation information of the image block.

The determining unit 204 is further used for determining a maximum compensation information variable quantity of the infrared decompression image according to a plurality of compensation information variable quantities of the image blocks and judging whether the maximum compensation information variable quantity is less than a preset threshold.

The determining unit 204 is further used for determining that a matrix formed by the plurality of the iterative values of the compensation information of the image blocks to be the target compensation matrix if the maximum compensation information variable quantity is less than the preset threshold.

The determining unit 204 is further used for taking the iterative value of the compensation information of the image block as a new initial value if the maximum compensation information variable quantity is not less than a preset threshold, and performing the step of performing the iterative operation based on the initial value of the compensation information of the image block and the compensation information iterative optimization formula till the target compensation matrix is determined.

Furthermore, the dividing unit 201 is further used for respectively dividing the image block into one element of a group including an image block located at the center of the image, an image block located at one corner of the image and an image block located at a boundary of the image according to position information of the image block in the infrared decompression image.

Furthermore, the determining unit 204 is further used for: according to an image block located at the center of the image, respectively calculating derivative of the constraint optimization objective function with respect to the compensation information of each image block, and letting the derivative be zero to determine the first compensation information iterative optimization formula of each image block.

The determining unit 204 is further used for: according to an image block located at a corner of the image, respectively calculating derivative of the constraint optimization objective function with respect to the compensation information of each image block, and letting the derivative be zero to determine the second compensation information iterative optimization formula of each image block.

The determining unit 204 is further used for: according to an image block located at a boundary of the image, respectively calculating derivative of the constraint optimization objective function with respect to the compensation information of each image block, and letting the derivative be zero to determine the third compensation information iterative optimization formula of each image block.

Details not described by the embodiments refer to description of the embodiments shown in FIG. 1 to FIG. 4, and are not described herein again.

In the embodiments of the present disclosure, the target compensation matrix is determined by constructing the constraint optimization objective function, and the direct current component of the image block, the position of which in the infrared decompression image is the same as the position of the element value in the target compensation matrix, is compensated by utilizing the element values in the target compensation matrix so as to remove the blocking artifacts in the infrared decompression image, but not to remove the blocking artifacts by performing the smoothing process on pixel points at the boundary of the image blocks of the infrared decompression image; therefore, the direct current component lost by each image block can be compensated, and the block artifacts of decompression images compressed at various bit rates can be adaptively removed so as to improve operating efficiency. Additionally, the filtering unit is used for performing the smoothing process on the compensated infrared compression image so as to further improve the image quality.

In the above embodiments, the description of the embodiments each has a focus, and portions not described in detail in one embodiment may refer to the description of other embodiments.

The above describes the image processing method and device provided by the present disclosure. Those of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. An image processing method comprising:
    dividing an infrared decompression image with block artifacts into image blocks distributed in a rectangular array;
    acquiring boundary gray information of the image blocks, determining boundary drop information of each image block and its adjacent image block according to the boundary gray information of the image blocks, and obtaining drop information of the image block according to the boundary drop information;
    constructing a constraint optimization objective function of the infrared decompression image based on the boundary drop information, the drop information and preset compensation information;
    determining a target compensation matrix according to the constraint optimization objective function, wherein each element value in the target compensation matrix is a target value of compensation information of an image block, the position of which in the infrared decompression image is the same as the position of the element value in the target compensation matrix, and each element value in the target compensation matrix meets a condition, under which the constraint optimization objective function is minimum; and
    according to the element value in the target compensation matrix, compensating a direct current component of an image block whose position in the infrared decompression image is the same as that of the element value in the target compensation matrix, and performing smoothing process on the compensated infrared decompression image to remove the block artifacts in the infrared decompression image,
    wherein the determining the target compensation matrix according to the constraint optimization objective function comprises:
    respectively calculating derivative of the constraint optimization objective function with respect to the compensation information of each image block, and letting the derivative be zero to determine a compensation information iterative optimization formula of each image block; and
    determining the target compensation matrix according to a plurality of compensation information iterative optimization formulas of the image block.

2. The image processing method of claim 1, wherein the determining the target compensation matrix according to the plurality of compensation information iterative optimization formulas of the image block comprises:
    acquiring an initial value of the compensation information of the image block, performing the iterative operation based on the initial value of the compensation information of the image block and the compensation information iterative optimization formula to obtain an iterative value of the compensation information of each image block, and determining a compensation information variable quantity according to the initial value and the iterative value of the compensation information of the image block;

according to a plurality of the compensation information variable quantities of the image block, determining a maximum compensation information variable quantity of the infrared decompression image and judging whether the maximum compensation information variable quantity is less than a preset threshold; and if the maximum compensation information variable quantity is less than the preset threshold, the matrix formed by a plurality of the iterative values of the compensation information of the image block is a target compensation matrix; and if the maximum compensation information variable quantity is not less than the preset threshold, the iterative value of the compensation information of the image block is taken as a new initial value, and the step of performing the iterative operation based on the initial value of the compensation information of the image block and the compensation information iterative optimization formula is performed till the target compensation matrix is determined.

3. The image processing method of claim 1, wherein after acquiring boundary gray information of the image blocks, the method comprises:

respectively dividing the image block into one element of a group including an image block located at the center of the image, an image block located at one corner of the image and an image block located at a boundary of the image according to position information of the image block in the infrared decompression image.

4. The image processing method of claim 3, wherein the respectively calculating derivative of the constraint optimization objective function with respect to the compensation information of each image block, and letting the derivative be zero to determine the compensation information iterative optimization formula of each image block comprises:

according to the image block located at the center of the image, respectively calculating derivative of the constraint optimization objective function with respect to the compensation information of each image block, and letting the derivative be zero to determine a first compensation information iterative optimization formula of each image block;

according to the image block located at the corner of the image, respectively calculating derivative of the constraint optimization objective function with respect to the compensation information of each image block, and letting the derivative be zero to determine a second compensation information iterative optimization formula of each image block; and according to the image block located at the boundary of the image, respectively calculating derivative of the constraint optimization objective function with respect to the compensation information of each image block, and letting the derivative be zero to determine a third compensation information iterative optimization formula of each image block.

5. The image processing method of claim 4, wherein the first compensation information iterative optimization formula is as follows:

$$v_{i,j}^{k+1} = \frac{2Q_{i,j}^k - 2\varepsilon_{i,j} - \lambda_1(V^k - V_{i,j}^k)}{8 + \lambda_1 + \lambda_2},$$

$$2 \le i \le m-1, \, 2 \le j \le n-1;$$

the second compensation information iterative optimization formula is as follows:

$$v_{i,j}^{k+1} = \frac{2Q_{i,j}^k - 2\varepsilon_{i,j} - \lambda_1(V^k - V_{i,j}^k)}{4 + \lambda_1 + \lambda_2},$$

$$i = 1, m, \, j = 1, n;$$

the third compensation information iterative optimization formula is as follows:

$$v_{i,j}^{k+1} = \frac{2Q_{i,j}^k - 2\varepsilon_{i,j} - (-1)^{\varphi_1}\frac{1}{n^2}\lambda_3(D_{vr}^k + D_{\varepsilon r}) - \lambda_1 V^k + \left(\lambda_1 + \frac{1}{n^2}\lambda_3\right)v_{i,j}^k}{6 + \lambda_1 + \lambda_2 + \frac{1}{n^2}\lambda_3},$$

$$i = 1, m, \, 2 \le j \le n-1;$$

$$v_{i,j}^{k+1} = \frac{2Q_{i,j}^k - 2\varepsilon_{i,j} - (-1)^{\varphi_2}\frac{1}{m^2}\lambda_4(D_{vc}^k + D_{\varepsilon c}) - \lambda_1 V^k + \left(\lambda_1 + \frac{1}{m^2}\lambda_4\right)v_{i,j}^k}{6 + \lambda_1 + \lambda_2 + \frac{1}{m^2}\lambda_4},$$

$$2 \le i \le m-1, \, j = 1, n;$$

wherein $V_{i,j}^{k+1}$ is compensation information after an image block in the $i^{th}$ row and the $j^{th}$ column of the infrared decompression image performs the $k^{th}$ iterative operation, $Q_{i,j}^k$ is a sum of compensation information of image blocks adjacent to the image block in the $i^{th}$ row and the $j^{th}$ column of the infrared decompression image before the $k^{th}$ iterative operation is performed, $\varepsilon_{i,j}$ is drop information of the image block in the $i^{th}$ row and the $j^{th}$ column of the infrared decompression image, $\lambda_1$, $\lambda_2$, $\lambda_3$ and $\lambda_4$ respectively are a first weight parameter, a second weight parameter, a third weight parameter and a fourth weight parameter and are greater than 0, $V^k$ is a sum of compensation information of the plurality of image blocks before the $k^{th}$ iterative operation is performed, $D_{vr}^k$ and $D_{vc}^k$ are upper-lower-boundary compensation gradient and left-right-boundary compensation gradient before the $k^{th}$ iterative operation is performed, $D_{\varepsilon r}$ and $D_{\varepsilon c}$ are upper-lower-boundary drop different information and left-right-boundary drop different information, and $V_{i,j}^k$ is compensation information before the image block in the $i^{th}$ row and the $j^{th}$ column of the infrared decompression image performs the $k^{th}$ iterative operation.

6. An image processing device comprising:

a dividing unit, used for dividing an infrared decompression image with block artifacts into image blocks distributed in a rectangular array;

an acquiring unit, used for acquiring boundary gray information of the image blocks, determining boundary drop information of each image block and its adjacent image block according to the boundary gray information of the image blocks, and obtaining drop information of the image block according to the boundary drop information;

a constructing unit, used for constructing a constraint optimization objective function of the infrared decompression image based on the boundary drop information, the drop information and preset compensation information;

a determining unit, used for determining a target compensation matrix according to the constraint optimization objective function, wherein each element value in the target compensation matrix is a target value of compensation information of an image block, the position of which in the infrared decompression image is the same as the position of the element value in the target compensation matrix, and each element value in the target compensation matrix meets a condition, under which the constraint optimization objective function is minimum;

a compensating unit, used for compensating a direct current component of an image block, the position of which in the infrared decompression image is the same as the position of the element value in the target compensation matrix, according to the element value in the target compensation matrix; and a filtering unit, used for performing smoothing process on the compensated infrared decompression image to remove the block artifacts in the infrared decompression image, wherein the determining unit is further used for respectively calculating derivative of the constraint optimization objective function with respect to the compensation information of each image block, and letting the derivative be zero to determine a compensation information iterative optimization formula of each image block;

the determining unit is further used for determining the target compensation matrix according to a plurality of compensation information iterative optimization formulas of the image blocks;

the determining unit is further used for acquiring an initial value of the compensation information of the image block, performing an iterative operation based on the initial value of the compensation information of the image block and the compensation information iterative optimization formula to obtain an iterative value of the compensation information of each image block, and determining a compensation information variable quantity according to the initial value and the iterative value of the compensation information of the image block;

the determining unit is further used for determining a maximum compensation information variable quantity of the infrared decompression image according to a plurality of compensation information variable quantities of the image blocks and judging whether the maximum compensation information variable quantity is less than a preset threshold;

the determining unit is further used for determining that a matrix formed by a plurality of the iterative values of the compensation information of the image block is the target compensation matrix if the maximum compensation information variable quantity is less than the preset threshold; and the determining unit is further used for taking the iterative value of the compensation information of the image block as a new initial value if the maximum compensation information variable quantity is not less than the preset threshold, and performing the step of performing the iterative operation based on the initial value of the compensation information of the image block and the compensation information iterative optimization formula till the target compensation matrix is determined.

7. The image processing device of claim 6, wherein the dividing unit is further used for respectively dividing the image block into one element of a group including an image block located at the center of the image, an image block located at one corner of the image and an image block located at a boundary of the image according to position information of the image block in the infrared decompression image.

8. The image processing device of claim 7, wherein the determining unit is further used for: according to the image block located at the center of the image, respectively calculating derivative of the constraint optimization objective function with respect to the compensation information of each image block, and letting the derivative be zero to determine a first compensation information iterative optimization formula of each image block;

the determining unit is further used for: according to the image block located at the corner of the image, respectively calculating derivative of the constraint optimization objective function with respect to the compensation information of each image block, and letting the derivative be zero to determine a second compensation information iterative optimization formula of each image block;

the determining unit is further used for: according to the image block located at the boundary of the image, respectively calculating derivative of the constraint optimization objective function with respect to the compensation information of each image block, and letting the derivative be zero to determine a third compensation information iterative optimization formula of each image block.

* * * * *